United States Patent
Hanrath et al.

(10) Patent No.: US 6,328,510 B1
(45) Date of Patent: Dec. 11, 2001

(54) MACHINE TOOL FOR TRIAXIAL MACHINING OF WORK PIECES

(75) Inventors: Georg Hanrath, Erdmannhausen; Gerald Stengele, Bremen, both of (DE)

(73) Assignee: Hüller Hille GmbH (DE)

( * ) Notice: Subject to any disclaimer, the term of this patent is extended or adjusted under 35 U.S.C. 154(b) by 0 days.

(21) Appl. No.: 09/161,891

(22) Filed: Sep. 28, 1998

(30) Foreign Application Priority Data

Oct. 20, 1997 (DE) .............................................. 197 45 991
Feb. 14, 1998 (DE) .............................................. 198 06 085

(51) Int. Cl.$^7$ ............................... B32C 1/00; B23Q 1/26; B23Q 1/48
(52) U.S. Cl. ...................... 409/235; 409/204; 74/490.1; 74/490.12; 74/471 XY; 33/1 M
(58) Field of Search ...................................... 409/235, 107, 409/109, 204, 216, 86, 201; 33/1 M; 414/744.4, 917; 74/471 XY, 479.01, 490.1, 490.09, 490.12, 490.08; 144/135.2

(56) References Cited

U.S. PATENT DOCUMENTS

| | | | |
|---|---|---|---|
| 1,674,669 | * 6/1928 | Stedman | 74/471 XY |
| 3,618,465 | * 11/1971 | Brochard | 409/86 |
| 4,962,676 | 10/1990 | Vainstock . | |
| 4,972,574 | * 11/1990 | Isono et al. | 74/479.01 |
| 5,167,165 | * 12/1992 | Brucher et al. | 74/479.01 |
| 5,267,818 | * 12/1993 | Marantette | 409/235 |
| 5,378,282 | 1/1995 | Pollard . | |
| 5,569,004 | * 10/1996 | Marantette | 409/235 |
| 5,807,044 | * 9/1998 | Watari et al. | 409/235 |
| 5,903,125 | * 5/1999 | Prentice et al. | 33/1 M |
| 5,916,328 | * 6/1999 | Pritschow et al. | 74/490.01 |
| 5,919,014 | * 6/1999 | Weck et al. | 409/235 |
| 6,099,217 | * 8/2000 | Wiegand et al. | 409/216 |
| 6,157,157 | * 12/2000 | Prentice et al. | 33/1 M |
| 6,161,992 | * 12/2000 | Holy et al. | 409/216 |

FOREIGN PATENT DOCUMENTS 195 25 482 A1 1/1997 (DE) .
0 791 438 A2 8/1997 (EP) .

OTHER PUBLICATIONS

Weck, Sep. 1997, Dyna–M—compact, stiff, highly dynamic, *Laboratory for Machine Tools . . .*

* cited by examiner

Primary Examiner—William Briggs
Assistant Examiner—Erica D. Ergenbright
(74) Attorney, Agent, or Firm—McGlew and Tuttle, P.C.

(57) ABSTRACT

A machine tool for triaxial machining of work pieces with a machine rack. Couplers run on slewable bearings and being adjustable in an X-Y plane. These couplers are joined with a hinge. The machine tool is equipped with a tool carrier arranged at one coupler. The tool carrier is provided with a skid independently movable in X-Y-plane. The machine tool is equipped with independent drives for adjustment of the couplers. The machine tool which distinguishes itself by a simple and compact structure as well as by high stiffness of the coupler system in that at least two couplers (8,9) are run on bearings at two skids (4,5) which are adjustable in rack-proof guides by the aid of one drive each. The guides are mainly arranged in parallel to each other and with the couplers—if viewed in the projection on a X-Y plane—lying between the guides.

4 Claims, 5 Drawing Sheets

MACHINE TOOL FOR TRIAXIAL MACHINING OF WORK PIECES

FIELD OF THE INVENTION

The invention relates to a machine tool for triaxial machining of work pieces with a machine rack, wherein couplers run on slewable bearings and are adjustable in an X-Y plane, these couplers being joined with a hinge, the machine tool being equipped with a tool carrier arranged at one coupler, the tool carrier provided with a skid independently movable in X-Y-plane and said machine tool being equipped with independent drives for adjustment of couplers. The term coupler is defined hereunder as representing a lever or handlebar which is connected at both ends via single-axial and parallel-axial hinges to other components.

BACKGROUND OF THE INVENTION

A machine tool of the species described hereinabove is known (brochure "Dyna-M" of the machine tool laboratory of RWTH Aachen, September 1997). In the construction style known each of the two couplers is connected via another coupler to the machine rack so that four couplers form a W and/or M in a projection. The drives are designed as feedforward units run on slewable bearings at the machine rack, these feedforward units being run on slewable bearings at the tool carrier. By adjustment of one feedforward unit or both units the tool carrier can be adjusted within a work area lying in the X-Y plane. A work space is created by adjustment of the skid arranged on the tool carrier in Z-direction. This machine tool is built of a relatively complicated structure. And it also takes relatively much space. Another disadvantage is seen in the way of how the couplers are arranged, meaning that they are constantly subjected to torsional stresses in case of loads attacking at the cantilevered Z-skid and acting in the X-Y-plane. It represents a very unfavorable load case for the couplers which can be counteracted only by increasing the torsional stiffness.

SUMMARY AND OBJECTS OF THE INVENTION

It is the primary object of this invention to specify a machine tool of the species described hereinabove which distinguishes itself by a simple and compact structure as well as by high stiffness of the coupler system.

According to the invention at least two couplers are run on bearings at two skids which are adjustable in rack-proof guides by the aid of one drive each, with the guides being mainly arranged in parallel to each other and with the couplers—if viewed in the projection on a X-Y plane—lying between the guides. The couplers and the two skids with their guides can be accommodated in a relatively small space without this leading to a confinement of the work area attainable by the tool carrier in the X-Y plane. Its constructive build-up is simpler and well organized. Add to this that the stiffness of the coupler system is also improved substantially if only two couplers are implemented.

In a preferred construction style the couplers are connected to each other through hinges in the area of their ends averted from the skids. Thus it is possible to arrange the tool carrier at any point of the coupler allocated to it. Preferably, however, the tool carrier should be arranged in the area of the free end of a coupler because the work area in the X-Y plane will thus be maximized.

Besides the couplers may have different lengths. In particular the different lengths of the couplers can be so arranged that the couplers form an angle in a range of 90° in all operational positions, thus making a substantial contribution to the stiffening of the coupler system. But a smaller angle of e.g. 60° is also feasible.

If the tool carrier is directly fastened to a coupler it will twist on adjustment of couplers together with its coupler around its own axis. This can be avoided by implementing a construction style in which two couplers of the same length are mounted on bearings at one of the two skids with a reciprocal distance which are slewably connected like a parallelogram to one connecting coupler at their end averted from the skid, with the tool carrier being fastened to the connecting coupler.

Some examples for the construction styles of this invention as shown on the relevant drawings are explained in the following.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
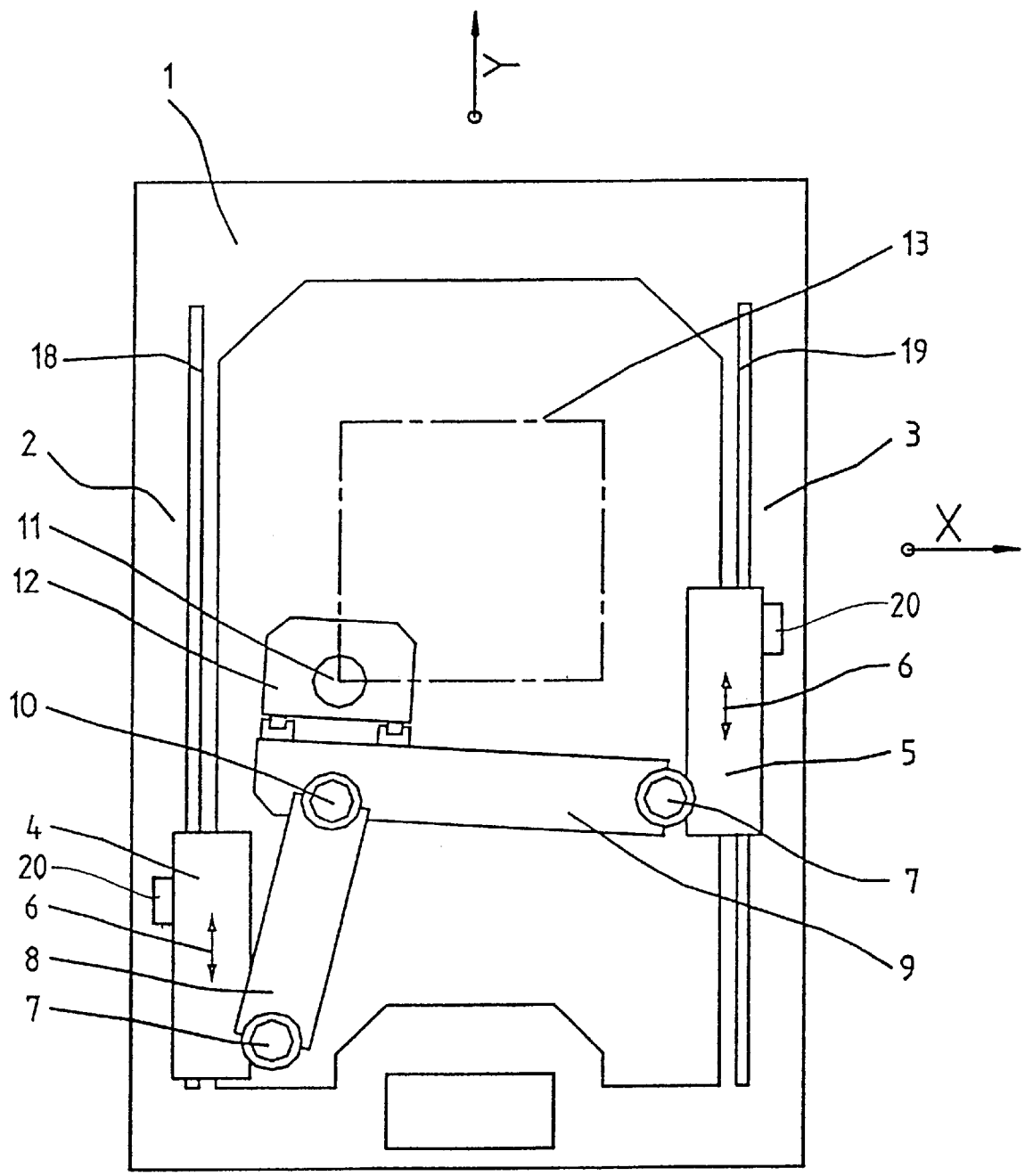
FIG. 1 is a schematic and partial view of the machine rack of a machine tool with a coupler system arranged therein.
Figure 2:
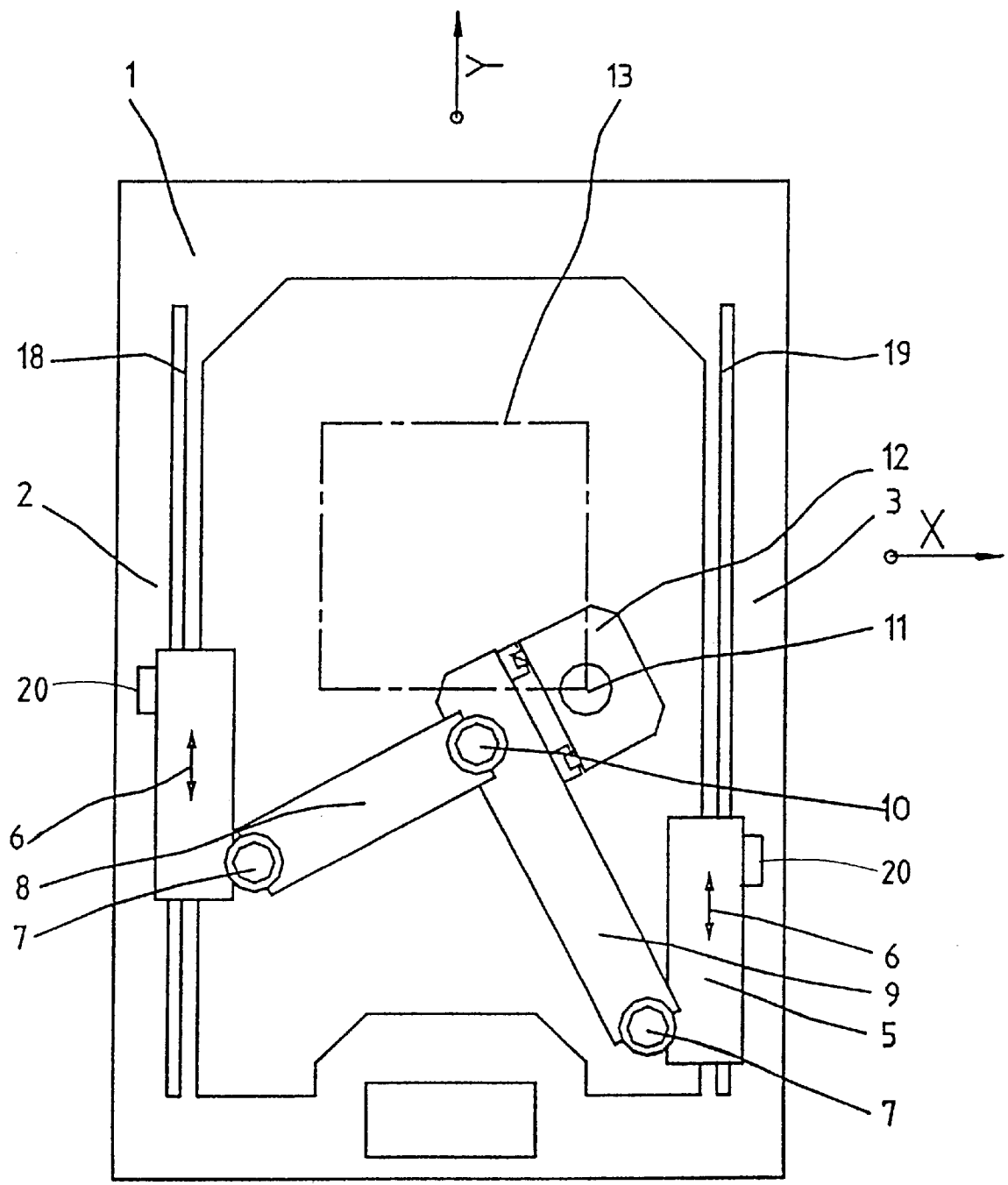
FIG. 2 is a schematic and partial view showing a function position of the subject as per FIG. 1.
Figure 3:
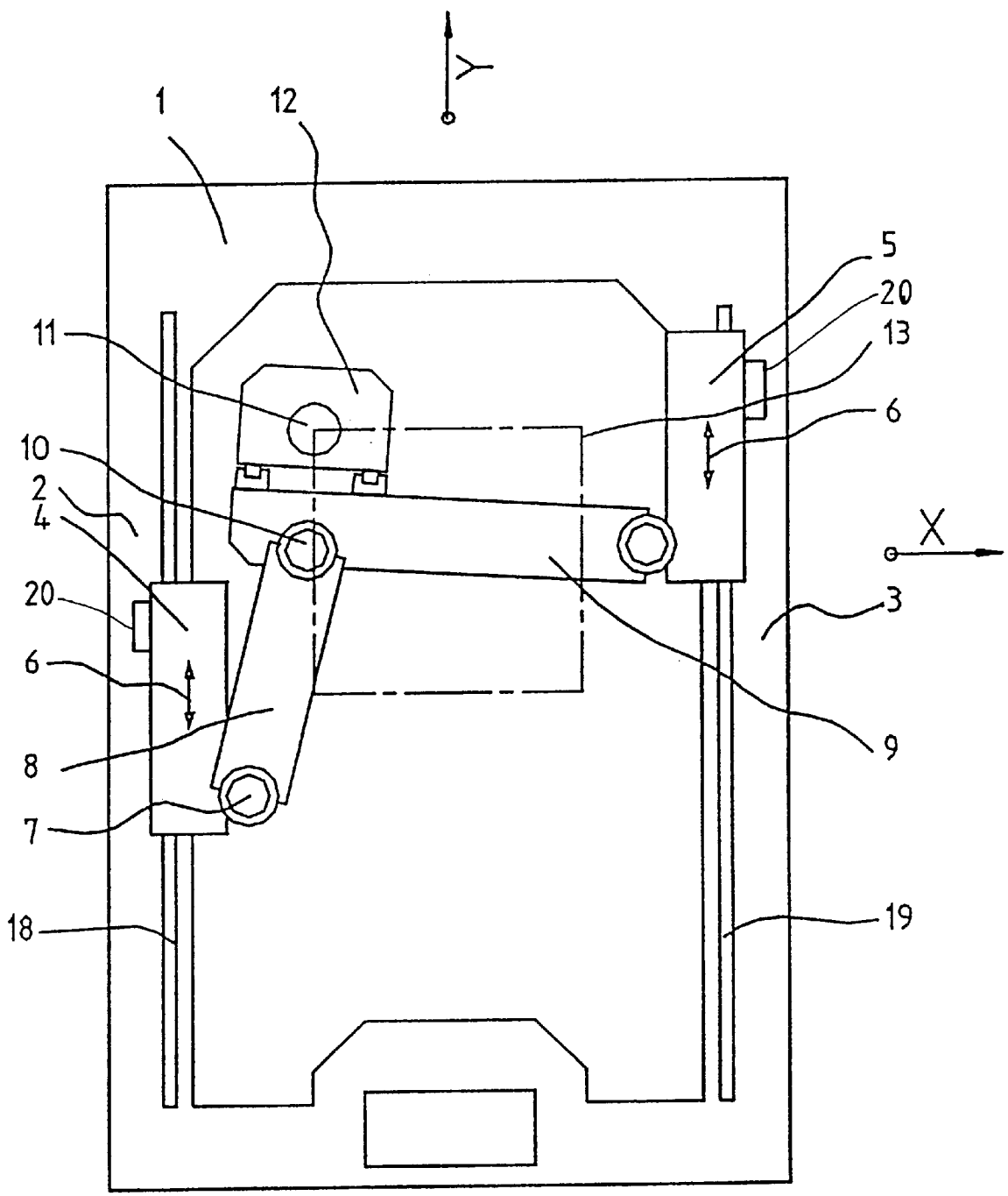
FIG. 3 is a schematic and partial view showing another function position of the subject as per FIG. 1.
Figure 4:
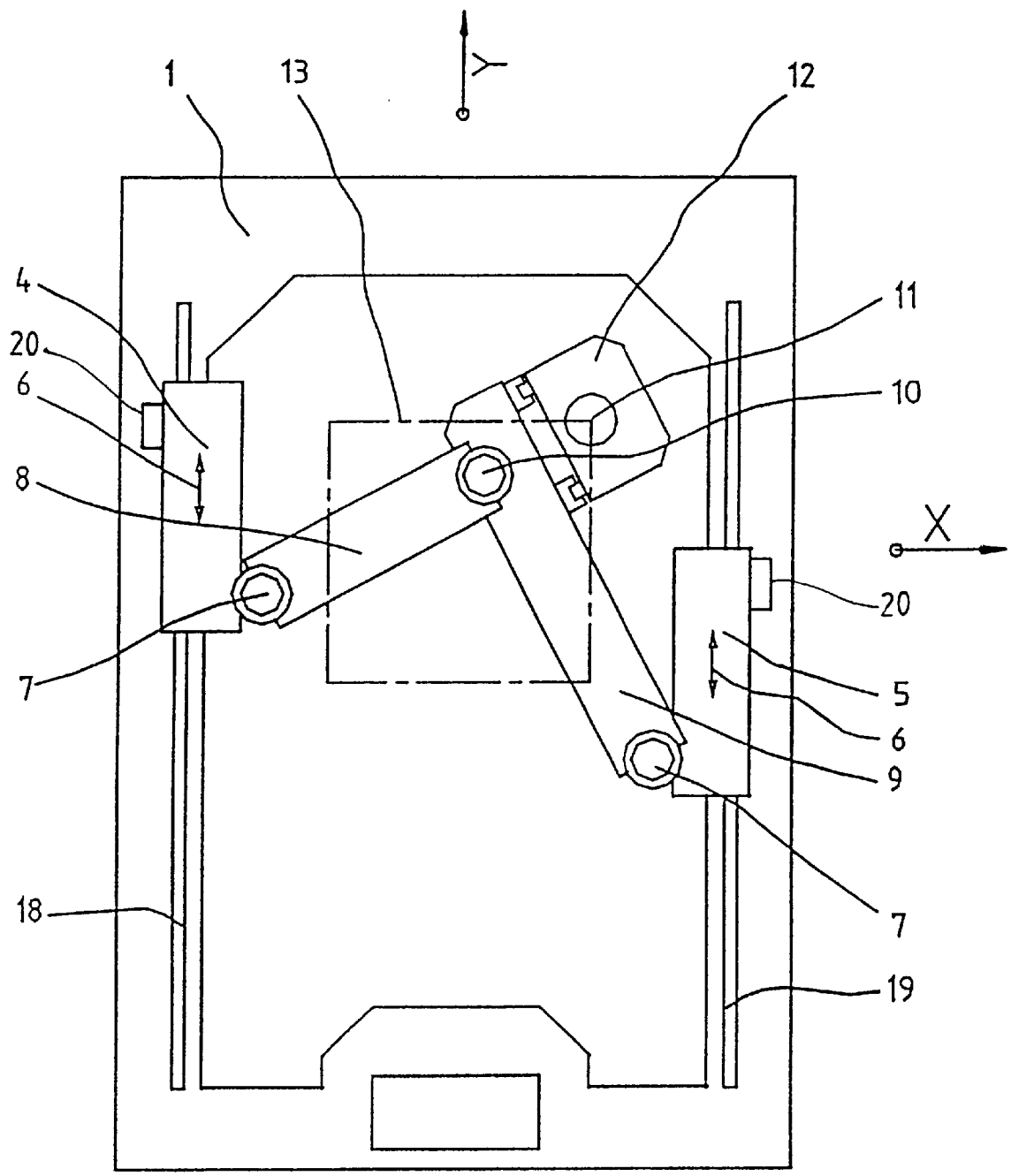
FIG. 4 is a schematic and partial view showing still another function position of subject as per FIG. 1.

Referring to the drawings in particular, the machine tool just shown partially serves for the triaxial machining of work pieces. It possesses a machine rack, of which only one frame 1 is illustrated whose frame cheeks 2,3 lying in an X-Y plane are equipped with guides 18, 19 lying opposite to each other and being parallel to each other. These guides serve to support sliding skids 4, 5. Each skid 4 and/or 5 is provided with a drive 20 by which the skid 4 and/or 5 is adjustable in the direction of the double arrow 6 along its guide. The drives 20 can be actuated independently of each other.

Each skid 4 and/or 5 carries a hinge 7 for a coupler 8 and/or 9 run on bearings arranged at it. The two couplers 8 and/or 9 are connected to each other through another hinge 10 in the area of their ends averted from the skid. The axles of the hinges 7, 10 are parallel to each other and mainly orthogonally directed towards the X-Y plane defined by the frame cheeks 2,3 and/or the guides arranged at them.

In the area of the skid-averted end of coupler 9 a tool carrier 11 is fastened on the side of coupler 9 averted from the hinge 10. The tool carrier 11 is provided with a skid 12 which is adjustable orthogonally to the X-Y plane, that means in direction Z by the aid of a drive not shown here. The skid carries a tool 20.

Couplers 8, 9 are of different length, with the lengths of couplers 8, 9 being so equipped that couplers 8, 9 form an angle in a range of 90° between them in all operational positions.

Comparing FIGS. 1 to 4 one can see that the tool carrier 11 can be adjusted in the X-Y plane by way of an independent adjustment of skids 4, 5 within a work area 13 shown in these Figures. A corresponding work space is created by adjusting the skid 12 in direction Z.

Figure 5:
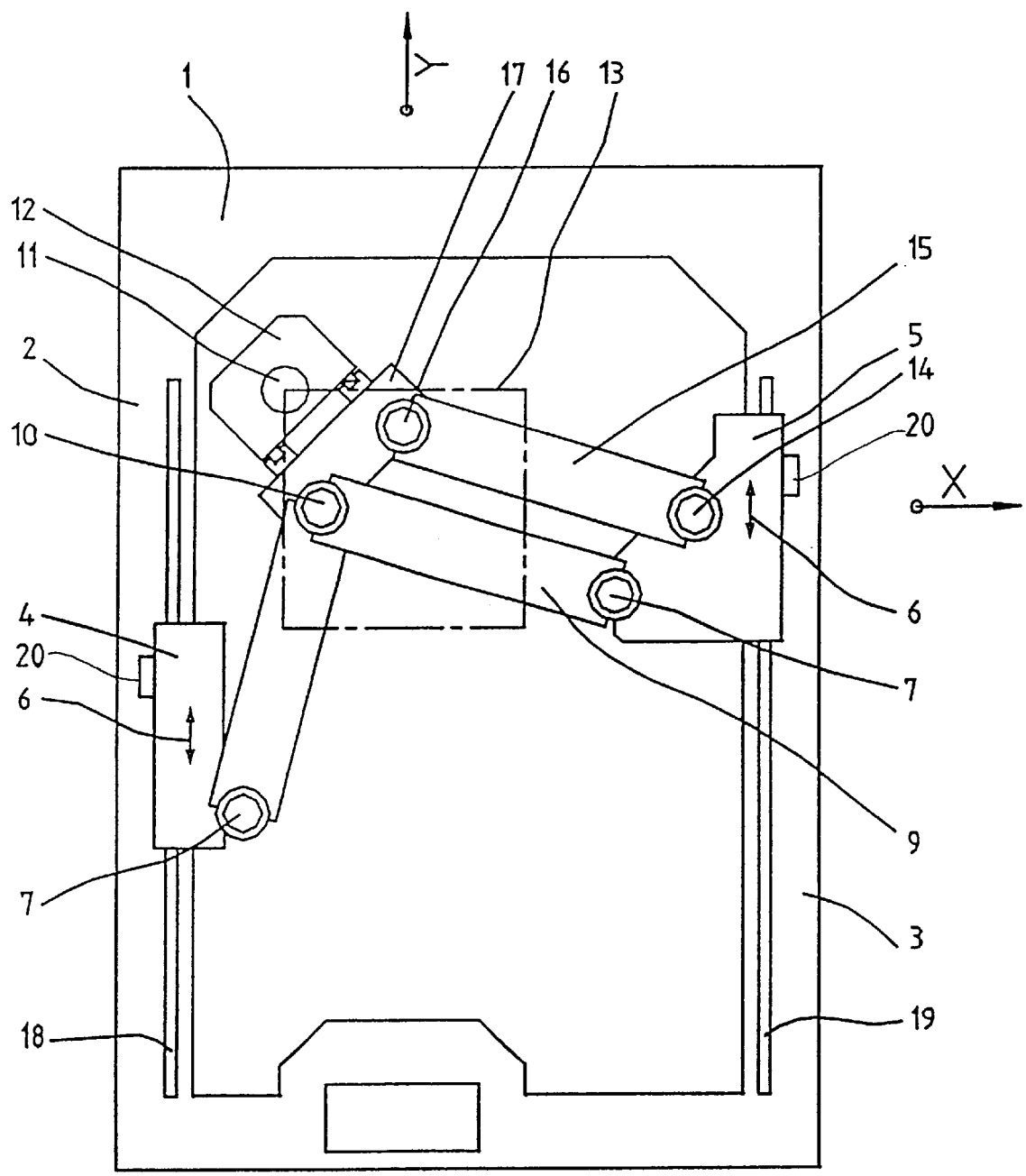
FIG. 5 is a schematic and partial view showing another construction style of the machine rack of a machine tool with a coupler system arranged therein.

In the construction style shown in FIG. 5 equal reference symbols designate equal parts. Arranged at skid 5 with a certain distance to hinge 7 is another hinge 14 for an additional coupler 15 which has got the same length as coupler 9, with the two skid-averted ends of couplers 9, 15 being connected through hinges 10, 16 to a connecting coupler 17 so that couplers 9, 15 together with the connecting coupler 17 and skid 5 form a parallelogram. Fastened to connecting coupler 17 is the tool carrier 11 which in this construction style does not make any slewing movement around its own axis when it is adjusted within work area 13.

While specific embodiments of the invention have been shown and described in detail to illustrate the application of the principles of the invention, it will be understood that the invention may be embodied otherwise without departing from such principles.

What is claimed is:

1. A machine tool with a machine rack, the machine tool being used for triaxial machining of workpieces, the machine tool comprising:

a first rack-proof guide;

a second rack-proof guide, said first rack-proof guide being arranged substantially in parallel to said second rack-proof guide;

a first independent drive;

a second independent drive;

a first skid disposed on said first rack-proof guide, said first skid being adjustably positionable by said first independent drive;

a second skid disposed on said second rack-proof guide, said second skid being adjustably positionable by said second independent drive;

a first hinge;

a second hinge;

a first coupler connected by said first hinge to said first skid and being adjustable in said first rack-proof guide in an X-Y plane, said first coupler lying between said first rack-proof guide and said second rack-proof guide, if viewed in a projection on the X-Y plane;

a second coupler connected by said second hinge to said second skid and being adjustable in said second rack-proof guide in the X-Y plane, said second coupler lying between said first rack-proof guide and said second rack-proof guide, if viewed in a projection on the X-Y plane;

a common hinge providing the only connection between said first coupler and said second coupler;

a tool carrier fastened only to said second coupler in the vicinity of said common hinge on a side of said second coupler averted from said first coupler, said tool carrier being unmovable with respect to said second coupler in the X-Y plane and said tool carrier being moveable in the X-Y plane upon movement of said first coupler and said second coupler.

2. The machine tool according to claim 1, wherein said first coupler and said second coupler form an angle between them that remains substantially unchanged for each position of the tool carrier in a work area.

3. The machine tool according to claim 1, wherein said first coupler has a length different from a length of said second coupler.

4. The machine tool according to claim 1, wherein said first coupler and said second coupler form substantially a 90° angle between them.

* * * * *